United States Patent [19]

Prucnal

[11] Patent Number: 4,598,131

[45] Date of Patent: Jul. 1, 1986

[54] CATALYSTS FOR CURABLE COATING VEHICLE BASED UPON AMINOALKYLOXY SILANES AND ORGANIC ISOCYANATES

[75] Inventor: Paul J. Prucnal, Pittsburgh, Pa.

[73] Assignee: PPG Industries, Inc., Pittsburgh, Pa.

[21] Appl. No.: 683,737

[22] Filed: Dec. 19, 1984

[51] Int. Cl.$^4$ .............................................. C08F 20/00
[52] U.S. Cl. ..................................... 525/440; 528/15; 528/17; 528/18; 528/20; 528/21; 528/23; 528/26; 528/28; 525/446; 525/453; 525/460; 556/419
[58] Field of Search ...................... 528/26, 23, 28, 21, 528/15, 17, 18, 20; 525/440, 453, 446, 460; 556/419

[56] References Cited

U.S. PATENT DOCUMENTS

| | | | |
|---|---|---|---|
| 3,345,194 | 10/1967 | Weldes et al. | 106/287 |
| 3,402,191 | 9/1968 | Morehouse | 260/448.2 |
| 3,426,057 | 2/1969 | Kanner | 260/448.2 |
| 3,453,122 | 7/1969 | Weldes et al. | 106/1 |
| 3,726,907 | 4/1973 | Tesoro et al. | 260/448.8 |
| 3,895,043 | 7/1975 | Wagner et al. | 260/448.8 |
| 3,956,353 | 5/1976 | Plueddemann | 260/448.8 |
| 4,031,120 | 6/1977 | Gervase | 260/448.8 |
| 4,501,872 | 2/1985 | Chang et al. | 528/19 |

*Primary Examiner*—Melvyn I. Marquis
*Attorney, Agent, or Firm*—Thomas M. Breininger

[57] ABSTRACT

Disclosed is a composition containing a novel ungelled resin in combination with an effective amount of a cure-promoting catalyst selected from the group consisting of triflic acid (i.e., trifluoromethane sulfonic acid), a neutralization product of triflic acid with ammonia, a neutralization product of triflic acid with an amine, a tetraalkyl ammonium salt of triflic acid, and mixtures of one or more of the aforesaid catalysts. The composition can be cured with moisture and/or with polyols and can be used to provide protective and/or decorative films on a variety of substrates.

The novel ungelled resin comprises a compound corresponding to a specified formula (I) which compound typically is prepared by reaction of an aminoalkyloxy silane with an organic isocyanate. The ungelled resin contains a hydrolyzable group that is attached directly to silicon.

20 Claims, No Drawings

CATALYSTS FOR CURABLE COATING VEHICLE BASED UPON AMINOALKYLOXY SILANES AND ORGANIC ISOCYANATES

BACKGROUND OF THE INVENTION

The present invention is directed to compositions containing cure-promoting catalysts. The compositions can be utilized as coating compositions as well as for other purposes. In particular, the invention is directed to compositions which can be cured with moisture and/or with polyols, which compositions contain certain catalysts. The catalyzed compositions of the invention can be used to provide protective and/or decorative films on a variety of substrates, which films exhibit an excellent combination of physical and chemical properties, particularly long term durability.

SUMMARY OF THE PRESENT INVENTION

A composition of the invention contains an ungelled resin in combination with an effective amount of a cure-accelerating catalyst selected from the group consisting of triflic acid (i.e., trifluoromethane sulfonic acid), a neutralization product of triflic acid with ammonia, a neutralization product of triflic acid with an amine, a tetraalkyl ammonium salt of triflic acid, and mixtures of one or more of the aforesaid catalysts. A preferred composition of the invention also contains an epoxy resin, particularly an aliphatic diglycidylether and/or a cycloaliphatic diepoxide. The ungelled resin for a composition of the invention comprises a compound which for convenience can be thought of as prepared from an organic isocyanate having an average functionality of at least 1; a silicon-containing compound corresponding to a specified formula (III) infra, the silicon-containing compound having at least one hydrolyzable group; and a compound containing at least 2 carbon atoms, at least 1 functional group reactive with a moiety on the silicon-containing compound and at least one amino group. A compound of the resin contains at least one hydrolyzable group from the silicon-containing compound. A compound of the resin also contains a residue of the silicon-containing compound bonded to a residue of the compound containing at least 2 carbon atoms through an oxygen-silicon (i.e.,

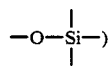

linkage. A patent application Ser. No. 682,644 filed Dec. 17, 1984 titled, CURABLE COATING VEHICLE BASED UPON AMINOALKYLOXY SILANES AND ORGANIC ISOCYANATES in the names of W. H. Chang and D. T. McKeough is directed to these ungelled resins.

DETAILED DESCRIPTION OF THE INVENTION

A composition of the invention contains an ungelled resin in combination with an effective amount of a cure-accelerating catalyst. The cure-accelerating catalyst is selected from the group consisting of triflic acid, a neutralization product of triflic acid with ammonia, a neutralization product of triflic acid with an amine, a tetraalkyl ammonium salt of triflic acid, and mixtures of one or more of the aforesaid catalysts.

Examples of amines suitable for the neutralization product of triflic acid with an amine include: alkyl amines such as monoethylamine, diethylamine, triethylamine, butylamine, dibutylamine, tributylamine, 1,1,3,3-tetramethylbutylamine, and methylbutylamine; alkanolamines such as ethanol amine, diethanol amine, diisopropanol amine, methyl diethanol amine, and dimethyl ethanol amine; aromatic amines such as phenylmethylamine, diphenylamine, phenyldiethanolamine, and 3-dimethylaminophenol; aralkyl amines such as dimethylaminomethyl benzene (i.e., benzyldimethylamine), benzylamine, and 4-dimethylaminomethylphenol (i.e., dimethyl-(4-hydroxybenzyl)amine; alicyclic amines such as piperidine or alkylpiperidines such as methylpiperidine; heterocyclic amines such as morpholine and N-ethylmorpholine, and the tetraalkylammonium salts of triflic acid such as tetrabutylammonium triflate and tetraethylammonium triflate.

A catalyzed composition of the invention contains an ungelled resin. The ungelled resin comprises a compound corresponding to the following formula (I),

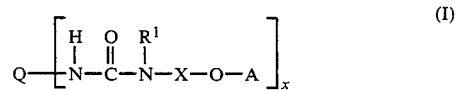

wherein

Q represents the residue of an organic isocyanate having an average isocyanate functionality of at least 1, $R^1$ independently represents H, a $C_1$ to $C_{10}$ alkyl radical, a $C_1$ to $C_{10}$ hydroxyalkyl radical, or a radical corresponding to the formula

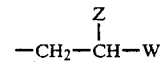

wherein Z represents H or $C_1$ to $C_4$ alkyl, and W represents

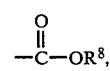

—C N, or

in which $R_8$ represents $C_1$ to $C_8$ alkyl,

X represents a divalent radical containing at least 2 carbon atoms optionally containing one or more groups selected from ether, amino, amido, carbamate, urea, and thio, A Represents a monovalent silicon-containing group corresponding to the formula

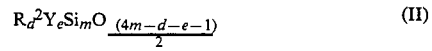

wherein $R^2$ independently represents hydrogen, a $C_1$ to $C_{10}$ alkyl group, a $C_4$ to $C_{10}$ cycloalkyl group, a $C_6$ to C$_{10}$ aryl group, or a monovalent aminoalkyl group, that is directly attached to Si, Y represents a hydrolyzable group that is attached directly to Si, m is an integer ranging from 1 to 5, e is a positive integer wherein $1 \leq e \leq 11$, d is zero or a positive integer wherein $0 \leq d \leq 10$, and $3 \leq d+e \leq 11$, and wherein x is a positive number which is equal to or less than the average isocyanate functionality of said organic isocyanate.

Examples of the hydrolyzable groups, Y, include

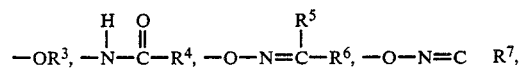

and the C$_2$ to C$_3$ residue of a 1,2- or a 1,3-glycol wherein

R$^3$ represents C$_1$–C$_7$ alkyl, C$_6$–C$_8$ cycloalkyl, C$_6$–C$_8$ aryl, or C$_3$–C$_8$ alkoxyalkyl, R$^4$ represents H or C$_1$–C$_4$ alkyl, R$^5$ and R$^6$ independently represent C$_1$–C$_4$ alkyl, C$_6$–C$_8$ cycloalkyl, or C$_6$–C$_8$ aryl, and R$^7$ represents C$_4$–C$_7$ alkylene.

It is preferred that the aforesaid monovalent silicon-containing group (formula II) in the ungelled resin for the catalyzed composition of the invention contain at least 2 of the hydrolyzable groups Y which may be the same or different.

In formula (I) defined above, R$^1$ preferably is H or C$_1$ to C$_{10}$ alkyl.

An organic isocyanate for preparing the ungelled resin for a catalyzed composition of the invention essentially can be any organic isocyanate having an isocyanate functionality of at least 1, preferably greater than 1.8, most preferably equal to or greater than 2. The organic isocyanate can be a single compound or a mixture of compounds. It is to be understood that when a mixture of organic isocyanate compounds is employed, the isocyanate functionality referred to above is an average isocyanate functionality determined for the mixture. The organic isocyanate can be an isocyanate-terminated prepolymer prepared by the generally known prepolymer technique in which a polyol and polyisocyanate are reacted in relative proportions to produce an isocyanate-terminated prepolymer. Also, mixtures of organic isocyanate prepolymers with monomeric isocyanates (so-called semi-prepolymers) may be employed in the prepolymer technique.

Examples of organic isocyanates for preparing the ungelled resin for a catalyzed composition of the invention include aromatic, aliphatic, cycloaliphatic, and heterocyclic isocyanates and they may be unsubstituted or substituted with groups such as halogen, etc. Many such organic isocyanates are known, specific examples of which include: toluene-2,4-diisocyante, toluene-2,6-diisocyanate, and mixtures thereof; diphenylmethane-4,4'-diisocyanate, diphenylmethane-2,4'-diisocyanate and mixtures thereof; p-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis-(isocyanatoethyl)fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenyl-methane-2,4'-diisocyanate, perhydrodiphenylmethane-4,4'-diisocyanate, the isocyanurate of isophorone diisocyanate (available as T-1890 from Veba Chemie), the biuret of hexamethyl diisocyanate (available as DESMODUR-N from Mobay Chemical Corp.), and mixtures thereof.

In a preferred composition of the invention, an isocyanate-terminated prepolymer which is a reaction product of an organic polyisocyanate and one or more polyols having an average molecular weight ranging from 62 to about 3,000 is utilized as the organic isocyanate to provide a residue symbolized by Q in formula (I) above. In this composition, it is particularly preferred that the polyol component for preparation of the isocyanate-terminated prepolymer comprise a polyol containing at least one carboxylic acid group, optionally in combination with a monohydric alcohol containing a carboxylic acid group. For this purpose, various hydroxy acids can be employed including such compounds as dimethylol propionic acid, 2,4,6-trihydroxybenzoic acid, 4,4-bis(4-hydroxyphenyl)-pentanoic acid, and the like, optionally in combination with hydroxy acids such as hydroxyacetic acid, beta-hydroxy propionic acid, alpha-hydroxy butyric acid, mandelic acid, hydroxy caproic acid, and the like. Examples of organic isocyanates suitable for preparing the isocyanate-terminated prepolymer include any of organic isocyanates described previously for preparing the ungelled resin for a catalyzed composition of the invention.

Examples of polyols suitable for preparation of isocyanate-terminated prepolymers include polyols in the broad classes including: simple diols, triols, and higher hydric alcohols; polyester polyols optionally modified with a fatty acid; polyether polyols; amide-containing polyols; and polyurethane polyols.

The simple diols, triols, and higher hydric alcohols useful in the preparation of the isocyanate-terminated prepolymers are generally known, examples of which include: ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; dipropylene glycol; the alkoxylation product of 1 mole of 2,2-bis(4-hydroxyphenyl)propane (i.e., bisphenol-A) and 2 moles of propylene oxide available as DOW-565 from Dow Chemical Company; and the like.

Polyester polyols useful in the preparation of isocyanate-terminated prepolymers are generally known and are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids. In a particularly preferred embodiment of the invention, the polyester polyol has an average molecular weight ranging from about 170 to about 2,000. Examples of suitable polycarboxylic acids include: phthalic acid, isophthalic acid, terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid, 3,3-dimethylglutaric acid; 2,2-dimethylglutaric acid; maleic acid; fumaric acid; itaconic acid; and the like. Anhydrides of the above acids, where they exist, can also be employed and are encompassed by the term "polycarboxylic acid." In addition, certain materials which perform in a manner similar to acids to form polyester polyols are also useful. Such materials include lactones such as caprolactone, propylolactone and methyl caprolactone, and hydroxy acids such as hydroxy caproic acid and dimethylol propionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, the term polyester polyols as used herein is intended to encompass polyester polyols optionally modified with fatty acids or glyceride oils of fatty acids (i.e., conventional alkyd polyols containing such modification).

Examples of the optional monohydric alcohols which may be used to prepare the polyester polyols include: ethanol, propanol, isopropanol, n-pentanol; neopentyl alcohol; 2-ethoxyethanol; 2-methoxyethanol; 1-hexanol; cyclohexanol; 2-methyl-2-hexanol; 2-ethylhexyl alcohol; 1-octanol, 2-octanol, 1-nonanol; 5-butyl-5-nonanol; isodecyl alcohol; and the like.

Polyether polyols which may be used in the preparation of isocyanate-terminated prepolymers are generally known. Examples of polyether polyols include the poly-(oxyethylene) glycols and poly(oxypropylene) glycols prepared by the acid or base catalyzed addition of ethylene oxide and/or propylene oxide to ethylene glycol, propylene glycol or dipropylene glycol initiators and by the copolymerization of propylene oxide and ethylene oxide with initiator compounds such as trimethylolpropane, glycerol, pentaerythritol, sorbitol, sucrose and the like. The polyether polyols also include the generally known poly(oxytetramethylene) glycols prepared by the polymerization of tetrahydrofuran in the presence of Lewis acid catalysts such a boron trifluoride, tin (IV) chloride, antimony pentachloride, antimony trichloride, phosphorous pentafluoride, and sulfonyl chloride. Other examples of polyether polyols include the generally known reaction products of 1,2-epoxide-containing compounds with polyols such as those included in the description of simple diols, triols, and higher hydric alcohols above.

Amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable diamines and amino-alcohols include hexamethylenediamine, ethylenediamine, phenylenediamine, toluenediamine; monoethanolamine, diethanolamine, N-methylmonoethanolamine, isophoronediamine, 1,6-menthanediamine and the like.

Polyurethane polyols are generally known. Polyurethane polyols can be produced by reacting any of the above-described polyols, including diols, triols, and higher alcohols, polyester polyols, polyether polyols, and amide-containing polyols with an organic polyisocyanate. The organic polyisocyanate may be reacted with the polyol either directly to form the polyurethane polyol or by the generally known prepolymer technique wherein the polyol and polyisocyanate are reacted in relative proportions to first produce an isocyanate-terminated prepolymer with subsequent reaction of the prepolymer with additional polyol to form the polyurethane polyol. Also, mixtures of organic isocyanate prepolymers with monomeric isocyanates (so-called semi-prepolymers) may be employed in the prepolymer technique. The organic polyisocyanate may be any organic polyisocyanate described previously.

Polyester polyols containing modification by fatty acids, (commonly referred to as alkyd polyols) which optionally may be used in the preparation of the isocyanate-terminated prepolymer, are generally known. As used herein, the term "alkyd polyols" refers to alkyd resins containing hydroxyl functionality. They typically are produced by reacting polyhydric alcohols, polycarboxylic acids, and fatty acids derived from drying, semi-drying or non-drying oils in various proportions depending upon the extent of hydroxyl functionality and properties desired in the alkyd polyol. The techniques of preparing alkyd resins are well known generally. Usually, the process involves reacting together the polycarboxylic acid and fatty acid or a partial glyceride thereof and the polyhydric alcohol (the latter usually is stoichiometric excess) in the presence of a catalyst such as litharge, sulfuric acid, or sulfonic acid to effect esterification with evolution of water. Examples of polyhydric alcohols typically used for preparation of the alkyd polyols include the simple diols, triols and higher hydric alcohols known in the art including but not limited to the previously described simple diols, triols and higher hydric alcohols. Examples of polycarboxylic acids suitable for preparation of the alkyd polyols include those set forth previously in the description of polycarboxylic acids useful for preparing the polyester polyols in general. Examples of suitable fatty acids include saturated and unsaturated acids such as stearic acid, oleic acid, ricinoleic acid, palmitic acid, linoleic acid, linolenic acid, licanic acid, elaeostearic acid, clupanodonic acid and mixtures thereof. The fatty acids may be in the form of the free acids with sufficient excess of the polyhydric alcohol being incorporated into the esterification mixture to compensate for their inclusion. However, in many instances, it is preferred to employ glyceride oils which have been partially alcoholized with a sufficient amount of a polyhydric alcohol such as glycerol to supply the requisite amount of available hydroxyls for the formation of the alkyd polyol.

The divalent radical represented by X in formula (I) above can be provided for a compound containing at least 2 carbon atoms, at least 1 functional group reactive with a moiety on the silicon-containing compound, and at least one amino group. Optionally, the divalent radical represented by X in formula (I) can be provided from a compound as described above but additionally containing one or more groups selected from ether, amino, amido, carbamate, urea, and thio.

Typically, compounds which have been utilized herein to provide the divalent radical X in formula (I) include hydroxyl-containing amines such as alkanolamines, dialkanolamines, alkyl alkanolamines, and aryl alkanolamines containing at least 2 and typically no more than 18 carbon atoms in the alkanol, alkyl and aryl chains. Examples of such hydroxyl-containing amines include: ethanolamine, propanolamine, 2-amino-2-methyl propanol, N-methylethanolamine, diethanolamine, N-phenylethanolamine, N-cyclohexylethanolamine, N-(3-ethylthio-2-hydroxypropyl)ethylenediamine, N-(3-ethylthio-2-hydroxypropyl)ethylamine, N-(3-butylthio-2-hydroxypropyl)ethylenediamine, N-(4-cyclohexylthio-3-hydroxybutyl)ethylenediamine, N-(3-allylthio-2-hydroxypropyl)hexamethylenediamine, N-(2-hydroxypropyl)ethylenediamine, N-(2-hydroxyethyl)ethylenediamine, para-aminophenol, aminoethylethanolamine, monohydroxyethyldiethylenetriamine, bishydroxyethyl-diethylenetriamine, and 2-amino-1-phenylethanol.

A wide variety of hydroxyl-containing amines can be prepared, for example, in known manner by reacting monoamines or polyamines with a monoepoxide provided that the amine reactant contains at least one primary amino group. Examples of the monoamines and polyamines include: methylamine, ethylamine, n-propylamine, isopropylamine, n-butylamine, tert-butylamine, n-hexylamine, cyclohexylamine, benzylamine, ethylenediamine, diethylenetriamine, triethylenetetramine, 1,4-diaminobutane, and hexamethylenediamine. Examples of the monoepoxides include: ethylene oxide, propylene oxide, styrene oxide, cyclohexene oxide, phenyl glycidyl ether, allyl glycidyl ether, tolyl glycidyl ether, the diacetate of a monoglycidyl ether of glycerol; the dipropionate of a monoglycidyl ether of glycerol and epichlorohydrin. The reaction between the amines and monoepoxides is usually effected merely by brining the components together in proper proportions.

Hydroxyl-containing amines which also contain amide groups can be prepared, for example, in known manner by reacting polyamines, such as those described previously for reaction with monoepoxides, with lactones such as caprolactone, propylolactone and methyl caprolactone. Hydroxyl-containing amines which also contain amide and urea groups can be prepared, for example, in known manner by reacting a polyisocyanate or isocyanate-terminated prepolymer, such as those described previously, with an excess of polyamine to form the urea-containing polyamine product and subsequently reacting this product with a lactone to produce the hydroxyl-containing amine which also contains amide and urea groups. Hydroxyl-containing amines which also contain carbamate (i.e. urethane) groups can be prepared, for example, in known manner by reacting polyamines such as those described previously with alkylene carbonates such as propylene carbonate to produce the hydroxyl-containing amines which also contain a carbamate (i.e. urethane) group. An example of another known way of producing hydroxyl-containing amines which also contain carbamate groups is to react a polyisocyanate or isocyanate-terminated prepolymer with an excess of polyamine to form the urea-containing polyamine product and subsequently to react this product with an alkylene carbonate such as propylene carbonate to produce the hydroxyl-containing amine which also contains urea groups can be prepared in known manner by reacting together a polyamine, a hydroxyl-functional amine such as an alkanolamine, etc., and a polyisocyanate or isocyanate-terminated prepolymer. The aforesaid hydroxyl-containing amines are merely illustrative of various hydroxyl-containing amines which are examples of suitable starting materials for providing the divalent radical X in formula (I) for preparing the ungelled resin for a catalyzed composition of the invention by reaction of the hydroxyl-containing amine with the organic isocyanate having an average functionality of at least one and a silicon-containing compound corresponding to the following formula (III)

wherein
  $R^2$ independently represents hydrogen, a $C_1$ to $C_{10}$ alkyl group, a $C_4$ to $C_{10}$ cycloalkyl group, a $C_6$ to $C_{10}$ aryl group, or a monovalent aminoalkyl group, that is directly attached to Si,
  Y independently represents a hydrolyzable group that is attached directly to Si,
  m is an integer ranging from 1 to 5,
  e is a positive integer wherein $1 \leq e \leq 12$,
  d is zero or a positive integer wherein $0 \leq d \leq 10$, and $4 \leq d + e \leq 12$, and
  wherein x is a positive number which is equal to or less than the average isocyanate functionality of said organic isocyanate.

A silicon-containing compound for preparing the ungelled resin for a catalyzed composition of the invention is organic and is essentially free of alkali metal ions which distinguishes it from known inorganic silicates such as alkali metal silicates including, for example, sodium orthosilicate. Additionally, the silicon-containing compound has groups directly bonded to silicon which are hydrolyzable. Examples of the hydrolyzable groups include $$-OR^3, \quad -\overset{H}{\underset{|}{N}}-\overset{O}{\underset{\|}{C}}-R^4, \quad -O-N=\overset{R^5}{\underset{|}{C}}-R^6, \quad -O-N=C\ R^7,$$

and the $C_2$ to $C_3$ residue of a 1,2- or 1,3- glycol wherein $R^3$, $R^4$, $R^5$, $R^6$, and $R^7$ are as set forth previously in the examples for Y under the definitions for formula (II).

Silicon-containing compounds corresponding to formula (III) may be monosilicon-containing and/or polysilicon-containing materials. Examples of monosilicon-containing compounds include compounds such as tetraethylorthosilicate, methyltriethoxysilane, dimethyldimethoxysilane, etc. Examples of polysilicon-containing compounds include hexaethoxydisiloxane, dimethyltetraethoxydisiloxane, octaethoxytrisiloxane, methyl-pentaethoxydisiloxane, as well as compounds containing a plurality of repeating siloxane linkages (i.e., a plurality of

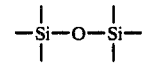

linkages). Typically the polysilicon-containing compounds are prepared in generally known manner by the hydrolysis and condensation of monomeric silicon-containing compounds containing silicon atoms attached to substituents convertible to silanol

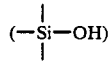

groups. These hydrolysis reactions typically may be illustrated as,

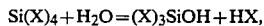

in which X can be an easily hydrolyzable group such as $C_1$-$C_3$ alkoxy,

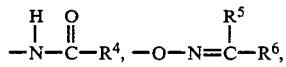

and $-O-N=C\ R^7$, which are defined as above. The silanol-containing products are condensed to produce

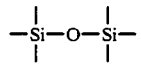

linkages in the silicon-containing compounds. Of course, it should be understood that polymeric silicon-containing compounds include those hydrolyzed and condensed materials prepared from precursors which contain silicon atoms attached to hydrolyzable substituents other than the hydrolyzable groups set forth above, such hydrolyzable substituents including, for example, hydrogen.

It is also considered to be within the scope of the present invention to use mixtures of monosilicon-containing compounds and polysilicon-containing compounds to prepare the ungelled resin for a catalyzed composition of the present invention.

By way of illustration, an especially desirable class of monosilicon-containing compounds suitable for preparing the ungelled resins for the catalyzed compositions of the invention include organosilicates. Examples of organosilicates include: tetramethoxysilane, tetraethoxysilane, tetra-n-propoxysilane, methoxytriethoxysilane, and the like.

In a procedure for preparing the ungelled resin for a catalyzed composition of the invention, an aminoalcohol such as 2-amino-2-methylpropanol is first reacted with an organosilicate such as tetraethylorthosilicate to produce a product containing aminoalkyloxy and ethoxysilyl groups, which product can be referred to as an aminoalkyloxy silane. During the reaction of the aminoalcohol and the organosilicate, the ethoxysilyl group of the organosilicate reacts with the hydroxyl group of the aminoalcohol to produce an aminoalkyloxy silane. Thereafter, the aminoalkyloxy silane is reacted with an isocyanate-terminated polyisocyanate prepolymer to produce the ungelled resin which, preferably, is essentially free of isocyanate groups. The above procedure is considered to be merely illustrative of a preferred way to produce the ungelled resin for a catalyzed composition of the invention. The following is an illustrative description of additional ways by which the ungelled resins can be prepared.

In one procedure for preparing the ungelled resin for a catalyzed composition of the invention, an excess of a polyamine such as those described previously is reacted with a polyisocyanate or isocyanate-terminated prepolymer to form an amine-terminated product which also contains urea groups. Thereafter, the amine-terminated product is reacted with an alkylene carbonate such as propylene carbonate to form a hydroxyl-functional product which also contains urea and urethane groups. Thereafter, the hydroxyl-functional product is reacted with the silicon-containing compound corresponding to formula (III) to form the ungelled resin.

In another procedure for preparing the ungelled resin for a catalyzed composition of the invention a polyamine such as those described previously, a hydroxyl-containing amine such as those described previously, and a polyisocyanate or isocyanate-terminated prepolymer are reacted in relative proportions such that a hydroxyl-functional product which also contains urea groups is obtained which thereafter is reacted with a silicon-containing compound corresponding to empirical formula (III) to form a resin of the invention.

In another procedure for preparing the ungelled resin for a catalyzed composition of the invention a polyisocyanate or isocyanate-terminated prepolymer is reacted with an excess of a hydroxyl-containing amine such as those described previously to form a first hydroxyl-functional product containing urea groups. Thereafter, this first hydroxyl-functional product (optionally after reaction with a silicon-containing compound corresponding to formula III above) is reacted at elevated temperature with an alkylene oxide such as ethylene oxide, propylene oxide and the like; or a monoglycidyl ether such as butyl glycidyl ether, phenyl glycidyl ether and the like; or with a monoglycidyl ester such as the glycidyl ester of versatic acid available as CARDURA-E (from Shell Chemical Co.) and the like to form a second hydroxyl-functional product containing urea as well as ether groups. Thereafter, this second hydroxyl-functional product is reacted with a silicon-containing compound corresponding to empirical formula (II) to form the ungelled resin.

In another procedure for preparing the ungelled resin for a catalyzed composition of the invention, a polyisocyanate or isocyanate-terminated prepolymer is reacted with an excess of a hydroxyl-containing amine such as those described previously to form a first hydroxyl-functional product containing urea groups. Thereafter, this first hydroxyl-functional product is reacted with a lactone such as caprolactone, propylolactone, butyrolactone and methylcaprolactone to form a second hydroxyl-functional product containing urea as well as ester groups. Thereafter, this second hydroxyl-functional product is reacted with a silicon-containing compound corresponding to formula (III) to form the ungelled resin.

It is preferred that the ungelled resin be essentially free of isocyanate radicals.

As can be appreciated from the disclosure and examples herein, a product ungelled resin typically will contain a mixture of compounds. For example, when the ungelled resin is prepared by reacting an isocyanate-functional prepolymer and an aminoalkyloxy silane (e.g., from the reaction of an amino alcohol and a silicon-containing compound corresponding to formula III) the resultant distribution of compounds in the product mixture will be determined at least in part by the statistics of reaction involved in either or both of (1) the reactions leading to formation of the isocyanate-functional prepolymer and (2) the reactions leading to formation of the aminoalkyloxy silane, as well as the reaction involved between the isocyanate-functional prepolymer and the aminoalkyloxy silane. However, one or more compounds corresponding to formula (I) will be present in the ungelled resin for a catalyzed composition of the invention.

A coating composition of the invention comprises the ungelled resin either as the sole film-forming resin or optionally in combination with other compatible resins known for use in coating compositions. Examples of such other resins which may be employed in combination with the ungelled resin in a coating composition include the generally known cellulosics, acrylics, aminoplasts, urethanes, polyesters, polyethers, epoxies and mixtures thereof. It is preferred to employ an epoxy resin, preferably a cycloaliphatic epoxy resin, in a catalyzed composition of the invention.

Cellulosics refer to the generally known thermoplastic polymers which are derivatives of cellulose, examples of which include: nitrocellulose; organic esters and mixed esters of cellulose such as cellulose acetate, cellulose propionate, cellulose butyrate, and preferably cellulose acetate butyrate (CAB); and organic ethers of cellulose such as ethyl cellulose.

Acrylic resins refer to the generally known addition polymers and copolymers of acrylic and methacrylic acids and their ester derivatives, acrylamide and methacrylamide, and acrylonitrile and methacrylonitrile. Additional examples of acrylic monomers which can be addition polymerized to form acrylic resins which may be used in compositions of the invention include methyl acrylate, ethyl acrylate, isopropyl acrylate, butyl acrylate, t-butyl acrylate, 2-ethylhexyl acrylate, cyclohexyl acrylate, 3,3,5-trimethylcyclohexyl acrylate, methyl methacrylate, ethyl methacrylate, isopropyl methacrylate, butyl methacrylate, t-butyl methacrylate, n-hexyl methacrylate, decyl methacrylate, isodecyl methacrylate, lauryl methacrylate, stearyl methacrylate, phenyl methacrylate, cyclohexyl methacrylate, isobornyl methacrylate, 2-hydroxyethyl methacrylate, hydroxypropyl methacrylate, glycidyl methacrylate, dimethylaminoethyl methacrylate, and t-butylaminoethyl methacrylate. Moreover, where desired, various other unsaturated monomers can be employed in the preparation of acrylic resins for compositions of the invention examples of which include: vinyl aromatic hydrocarbons such as styrene, alpha methyl styrene, and vinyl toluene; vinyl acetate; vinyl chloride; and unsaturated silicon-containing monomers such as gamma-methacryloxypropyl triethoxysilane, gamma-acryloxypropyl triethoxysilane, and the like.

Aminoplast resins refer to the generally known condensation products of an aldehyde with an amino- or amido-group containing substance examples of which include the reaction products of formaldehyde, acetaldehyde, crotonaldehyde, benzaldehyde and mixtures thereof with urea, melamine, or benzoguanamine. Preferred aminoplast resins include the etherified products obtained from the reaction of alcohols and formaldehyde with urea, melamine, or benzoguanamine. Examples of suitable alcohols for preparing these etherified products include: methanol, ethanol, propanol, butanol, hexanol, benzylalcohol, cyclohexanol, 3-chloropropanol, and ethoxyethanol.

Urethane resins refer to the generally known thermosetting or thermoplastic urethane resins prepared from organic polyisocyanates and organic compounds containing active hydrogen atoms as found for example in hydroxyl, and amino moieties. Some examples of urethane resins typically utilized in one-pack coating compositions include: the isocyanate-modified alkyd resins sometimes referred to as "uralkyds"; the isocyanate-modified drying oils commonly referred to as "urethane oils" which cure with a drier in the presence of oxygen in air; and isocyanate-terminated prepolymers typically prepared from an excess of one or more organic polyisocyanates and one or more polyols including, for example, simple diols, triols and higher alcohols, polyester polyols and polyether polyols. Some examples of systems based on urethane resins typically utilized as two-pack coating compositions include an organic polyisocyanate or isocyanate-terminated prepolymer (first pack) in combination with a substance (second pack) containing active hydrogen as in hydroxyl or amino groups along with a catalyst (e.g., an organotin salt such as dibutyltin dilaurate or an organic amine such as triethylamine or 1,4-diazobicyclo-(2:2:2)octane). The active hydrogen-containing substance in the second pack typically is a polyester polyol, a polyether polyol or an acrylic polyol known for use in such two-pack urethane resin systems. Many coating compositions based on urethanes (and their preparation) are described extensively in Chapter X Coatings, pages 453–607 of *Polyurethanes: Chemistry and Technology, Part III* by H. Saunders and K. C. Frisch, Interscience Publishers (N.Y., 1964).

Polyester resins are generally known and are prepared by conventional techniques utilizing polyhydric alcohols and polycarboxylic acids. Examples of suitable polyhydric alcohols include: ethylene glycol; propylene glycol; diethylene glycol; dipropylene glycol; butylene glycol; glycerol; trimethylolpropane; pentaerythritol; sorbitol; 1,6-hexanediol; 1,4-cyclohexanediol; 1,4-cyclohexanedimethanol; 1,2-bis-(hydroxyethyl)cyclohexane; and 2,2-dimethyl-3-hydroxypropyl-2,2-dimethyl-3-hydroxypropionate. Examples of suitable polycarboxylic acids include: phthalic acid, isophthalic acid, terephthalic acid; trimellitic acid; tetrahydrophthalic acid, tetrachlorophthalic acid; adipic acid; azelaic acid; sebacic acid, succinic acid, maleic acid; glutaric acid; malonic acid; pimelic acid; suberic acid; 2,2-dimethylsuccinic acid; 3,3-dimethylglutaric acid; 2,2-dimethylglutaric acid; maleic acid; fumaric acid; and itaconic acid. Anhydrides of the above acids, where they exist, can also be employed and are encompassed by the term "polycarboxylic acid". In addition, certain substances which react in a manner similar to acids to form polyesters are also useful. Such substances include lactones such as caprolactone, propylolactone and methyl caprolactone, and hydroxy acids such as hydroxy caproic acid and dimethylolpropionic acid. If a triol or higher hydric alcohol is used, a monocarboxylic acid, such as acetic acid and benzoic acid may be used in the preparation of the polyester resin. Moreover, polyesters which may be used in compositions of the invention are intended to include polyesters modified with fatty acids or glyceride oils of fatty acids (i.e., conventional alkyd resins). Alkyd resins typically are produced by reacting the polyhydric alcohols, polycarboxylic acids, and fatty acids derived from drying, semi-drying, and non-drying oils in various proportions in the presence of a catalyst such a litharge, sulfuric acid, or a sulfonic acid to effect esterification. Examples of suitable fatty acids include saturated and unsaturated acids such as stearic acid, oleic acid, ricinoleic acid, palmitic acid, linoleic acid, linolenic acid, licanic acid, elaeostearic acid, and clupanodonic acid.

Polyether resins are generally known and are prepared by well known techniques. Examples of polyethers include the poly(oxyalkylene) glycols prepared by the acid or base catalyzed addition of an alkylene oxide such as ethylene oxide and/or propylene oxide to initiator compounds such as ethylene glycol, propylene glycol, diethylene glycol, dipropylene glycol, trimethylolpropane, glycerol, pentaerythritol, sorbitol, sucrose and the like. Additional examples of polyethers include the generally known poly(oxytetramethylene) glycols prepared by the polymerization of tetrahydrofuran in the presence of Lewis acid catalysts such as boron trifluoride, tin (IV) chloride, antimony pentachloride, antimony trichloride, phosphorous pentafluoride, and sulfonyl chloride. Other examples of polyethers include the generally knwon reaction products of 1,2-epoxide-containing compounds with polyols such as simple diols, triols and higher hydric alcohols known in the art such as those described previously herein as useful in the preparation of isocyanate-terminated prepolymers.

Epoxy resins, often referred to simply as "epoxies", are generally known and refer to compounds or mixtures of compounds containing more than one 1,2-epoxy group of the formula

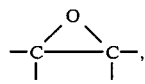

i.e., polyepoxides. The polyepoxides may be saturated or unsaturated, aliphatic, cycloaliphatic aromatic or heterocyclic. Examples of suitable polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and the hydrogenated derivatives thereof. The polyglycidyl ethers of polyphenols of various molecular weights may be produced, for examples, by varying the mole ratio of epichlorohydrin to polyphenol in known manner.

Epoxy resins also include the polyglycidyl ethers of mononuclear polyhydric phenols such as the polyglycidyl ethers of resorcinol, pyrogallol, hydroquinone, and pyrocatechol.

Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol, and 2,2-bis(4-hydroxycyclohexyl)propane.

Epoxy resins additionally include polyglycidyl esters of polycarboxylic acids such as the generally known polyglycidyl esters of adipic acid, phthalic acid, and the like.

Addition polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate.

A preferred class of epoxy resins for a catalyzed composition of the invention include aliphatic diepoxides such as aliphatic diglycidylethers and cycloaliphatic epoxides, examples of which include: the diglycidylether of hydrogenated bisphenol-A (available as DRH 151.1 from Shell Chemical Company), 3,4-epoxycyclohexylmethyl-3,4-epoxycyclohexane carboxylate (ERL-4221 from Union Carbide), vinyl cyclohexane dioxide (ERL-4206 from Union Carbide), 2-(3,4-epoxycyclohexyl-5,5-spiro-3,4-epoxy) cyclohexane-metadioxane (ERL-4234 from Union Carbide), and 3,4-epoxy-6-methylcyclohexylmethyl adipate (ERL-4289 from Shell Chemical Company). Of the aforesaid aliphatic diepoxides epoxies, the diglycidylether of hydrogenated bisphenol-A is particularly preferred.

Many additional examples of epoxy resins are described in the *Handbook of Epoxy Resins*, Henry Lee and Kris Neville, 1967, McGraw Hill Book Company.

The ungelled resins for the catalyzed compositions of the invention can also be combined with various polyols. Examples of polyols which may be utilized in the catalyzed compositions of the invention include the polyols in the broad classes previously described with respect to polyols suitable for preparation of the isocyanate-terminated prepolymers, namely: simple diols, triols, and higher hydric alcohols; polyester polyols optionally modified with a fatty acid; polyether polyols; amide-containing polyols; and polyurethane polyols.

In addition to the foregoing components, the catalyzed compositions of this invention may contain optional ingredients, including various pigments of the type ordinarily utilized in coatings of this general class. In addition, various fillers; plasticizers, antioxidants; mildewcides and fungicides; surfactants; various flow control agents including, for example, thixotropes and additives for sag resistance and/or pigment orientation based on polymer microparticles (sometimes referred to as microgels) described, for example, in U.S. Pat. Nos. 4,025,474; 4,055,607; 4,075,141, 4,115,472; 4,147,688; 4,180,489; 4,242,384; 4,268,547; 4,220,679; and 4,290,932 the disclosures of which are hereby incorporated by reference; and other such formulating additives may be employed in some instances.

The compositions herein can be applied by any conventional method, including brushing, dipping, flow coating, roll coating, etc., but they are most often applied by spraying. The compositions may be applied over a wide variety of substrates such as wood, metals, glass, cloth, plastics, foams and the like, as well as over primers.

Pigments suitable for a composition of the invention include a wide variety of pigments generally known for use in coating compositions. Suitable pigments include both metallic-flake pigments and various white and colored pigments.

Examples of metallic-flake pigments include the conventional metallic flakes such as aluminum flakes, nickel flakes, tin flakes, silver flakes, chromium flakes, stainless steel flakes, gold flakes, copper flakes and combinations thereof. Of the metallic-flake pigments, nonleafing aluminum flakes are preferred.

Examples of white and colored pigments include generally known pigments based on metal oxides; metal hydroxides; metal sulfides; metal sulfates; metal carbonates; carbon black; china clay; phthalo blues and greens, organo reds, and other organic dyes.

Coating compositions of the invention can provide cured films having an excellent combination of properties such as the hardness required for automotive coatings both for original equipment automotive applications and automotive refinishing applications, good solvent and water resistance, high initial gloss, good impact resistance and particularly excellent long term durability when exposed to weathering conditions as exist, for example, in Florida, United States of America.

In addition to the required cure-promoting catalyst described previously for a composition of the invention, one or more other catalysts may be employed in a composition of the invention, although it is preferred to utilize the required cure-promoting catalyst without such other catalysts. Examples of such other catalysts which may be employed include: acids and acid salts such as p-toluenesulfonic acid, butylstannoic acid, n-butylphosphoric acid, tin naphthenate, tin benzoate, tin octoate, tin butyrate, dibutyldin dilaurate, dibutyltin diacetate, iron stearate, and lead octoate; titanates such as tetraisopropyl titanate and tetrabutyl titanate; oxides such as dibutyltin oxide; and bases such as isophorone diamine, methylene dianiline, imidazole, aminopropyltriethoxysilane, aminoalcohols and other basic nitrogen-containing compounds.

The specific amounts of cure-promoting catalyst which can be included in the compositions of the invention may vary considerably depending upon factors such as curing temperature, rate of cure desired, optional film-forming resins in the compositions in addition to the ungelled resin described previously herein, the amount of moisture present in the ambient atmosphere, and the like. However, in general, a coating composition of the invention can contain from about 0.01 parts to about 5 parts by weight of cure-promoting catalyst based on 100 parts by weight of resin solids in the composition. Preferred compositions of the invention contain from about 0.1 parts to about 2 parts by weight of the cure-promoting catalyst based on 100 parts by weight of resin solids in the composition.

Although it is preferred to minimize the content of organic solvent in compositions of the invention, where desired, generally known organic solvents may be included since the ungelled resins described previously herein generally are compatible with organic solvents. Examples of suitable solvents include: alcohols, such as methanol, ethanol, propanol, butanol and the like; the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol dibutyl ether, diethylene glycol diethyl ether and diethylene glycol monobutyl ether acetate; ketones such as methylethyl ketone; esters such as butyl-acetate; hydrocarbons such as xylene and toluene; N-methyl-2-pyrrolidone; dimethyl formamide; and mixtures thereof.

Coating compositions of the invention typically can be cured by heating in the presence of atmospheric moisture; although, where curing time is not an important consideration, they may be cured at ambient temperature. Thus, once the ungelled resin for a composition of the invention and the cure-promoting catalyst are brought in contact with each other, as by admixing, and exposed to the ambient atmosphere, the composition will begin to cure. Accordingly, it is desirable in some instances to prepare a composition of the invention in the form of a two-package system, i.e., one package containing the ungelled resin for a composition of the invention along with desired optional ingredients and a second package containing the cure-promoting catalyst. When it is desired to coat a substrate with the composition, the components of the two packages are merely mixed together just prior to application and the resulting composition applied to the substrate by any of the methods described above.

A coating composition of the invention can comprise the ungelled resin for a catalyzed composition of the invention as the sole film-forming resin in the composition. In coating compositions of the invention containing the previously described ungelled resin, the cure-promoting catalyst, and various optional ingredients including, for example, those ingredients described previously such as other film-forming resins and polyols, the amounts of the individual components may vary widely depending on the intended use of the composition. However, generally coating compositions of the invention comprise from about 100 to about 10 percent by weight of the ungelled resin for a catalyzed composition of the invention, and from about 0 to about 90 percent by weight of optional other film-forming resin and/or polyol, based on the total weight of the composition. Preferred coating compositions of the invention comprise from about 30 to 100 percent by weight of the ungelled resin and 70 to 0 percent by weight of optional other film-forming resin and/or polyol, based on the total weight of the composition. In the compositions of the invention where the percent by weight of the ungelled resin for a catalyzed composition of the invention, optional other resins as described previously, optional polyol, and cure-promoting catalyst based on the total weight of the composition do not add up to 100 percent by weight, the balance is comprised of other optional ingredients of the types described previously.

The following examples illustrate the invention. Amounts and percentages are by weight unless specified otherwise. When used herein "pbw" means "parts by weight." Tests referred to in the following examples are conducted as follows.

TESTS (1) Gloss 60°—The value for gloss 60° represents the percent specular reflectance of light from the surface of the coating at an angle of 60 degrees from the direction normal to the surface of the coating.

(2) Hardness—An EAGLE Turquoise Drawing Pencil (from BEROL Corporation) is sharpened and the point is sanded to provide a flattened surface. The flattened tip is scraped at about a 45° angle to the coating while strong downward pressure is applied to the pencil. The value for hardness represents the designation of the "lead" in the hardest EAGLE Turquoise Drawing Pencil which does not scratch the coating in this test.

(3) Solvent Rubs—The number of double rubs is understood to mean the number of back and forth finger rubs across the coating with a cloth dipped in the indicated solvent. The number of double rubs indicated is the number that the cured coating can withstand before the substrate becomes visible through the coating. However, when the term "passed" is used to describe the results of this test, it means that the coating withstands at least 50 solvent rubs with the indicated solvent.

(4) Acid Resistance—To a coated substrate is applied a spot formed from 10 drops of 10 percent by volume muriatic acid (37 percent commercial grade hydrochloric acid) in tap water. The spot is covered with a watch glass and allowed to remain on the coating for 15 minutes at room temperature. Thereafter the spot of acid is washed off under running tap water. The term "passed" means that the coating shows no visible evidence of deterioration when subjected to this test.

(5) Watersoak—The coating on a substrate is scored down to the substrate in a crosshatched pattern of 1/16×1/16 inch squares. Thereafter, the substrate is immersed in deionized water at 100° F. (37.8° C.) for 24 hours, removed, and wiped dry. Next, tape (3M Transparent No. 710, ¾ inch wide) is firmly applied to the crosshatched area so as to eliminate voids and air pockets and thereafter sharply ripped from the coating. The term "passed" means that the crosshatched area is not removed from the substrate.

(6) Detergent Resistance—A coated substrate is soaked for 72 hours at 100° F. (37.8° C.) in a 15 gallon (56.8 liter) tank containing 505 grams (g) of sodium tetrapyrophosphate decahydrate, 107.7 g of anhydrous sodium sulfate, 39.7 g of sodium metasilicate, 5.7 g of anhydrous sodium carbonate, and 113.4 g of a sodium alkylarylsulfonate available as Fisher S-198 from Fisher Scientific Co. The term "passed" means that the coating shows no visible evidence of deterioration when subjected to this test.

(7) Impact—A coating on a substrate is subjected to a falling weight impact substantially according to test ASTM D 2794-69 (1974). Results are reported in the form "x/y" wherein x represents inch-pounds impacted on the coated side of the panel and y represents inch-pounds impacted on the reverse side.

(8) Stripper Resistance—A phenolic based paint stripper (EPCO 803 from Ensign Products Company) is applied directly to the coating, allowed to remain on the coating for 4 minutes, and thereafter removed by means of running water. The term "passed" means that the coating shows no visible evidence of deterioration and the coating remains adhered to the substrate.

(9) Mortar Resistance—Mortar in the form of a soft paste prepared by mixing 75 g of building lime (ASTM C 207-74) and 225 g of dry sand, both passing 10-mesh wire screen with about 100 g water, is applied at a thickness of about ¼ inch to the coating on a substrate. Thereafter the coated substrate is exposed for 24 hours to 100 percent relative humidity at 100° F. (37.8° C.). The term "passed" means that after the 24 hour period the mortar dislodges easily from the coating without loss of coating adhesion and without visible evidence of deterioration of the coating.

(10) Solids Content—The solids contents of composition herein are determined by generally known procedures either at 105° C. for 2 hours or 150° C. for 2 hours.

EXAMPLE 1

(a) An aminoalkyloxy silane is prepared as follows. A reaction vessel equipped with heating mantle, thermometer, stirrer and distillation column is charged at room temperature with a reaction mixture of 359.6 grams of 2-amino-2-methylpropanol and 840.4 grams of tetraethyl orthosilicate. The reaction mixture is heated and distillate is collected according to the schedule set forth in the following TABLE 1. The temperature of the reaction vessel and the head temperature of the distillation column are given for the end of each corresponding time period. The amount of distillate as represented in each horizontal row represents the total distillate collected up to the end of the corresponding time period (i.e., including that collected during the preceding time periods). The resulting product is an aminoalkyloxy silane.

TABLE 1

| Time (min) | Temperature of Reaction Vessel (°C.) | Head Temperature (°C.) | Total Distillate Collected (ml) |
|---|---|---|---|
| 0–50 | 112 | 79 | 20 |
| 50–80 | 120 | 78 | 125 |
| 80–140 | 145 | 80 | 200 |
| 140–182 | 172 | 71 | 235 |

(b) A polyisocyanate prepolymer is prepared as follows. A reaction vessel equipped with heating mantle, thermometer, stirrer, reflux condenser and source of nitrogen is charged at room temperature under a blanket of nitrogen with 77.3 grams of dimethylolpropionic acid, 815 grams of PCP-0200[1], 1108 grams of DESMODUR-W[2], and 220 grams of methylisobutyl ketone. The reaction mixture is heated over a period of 114 minutes to a temperature of 115° C. after which the reaction mixture is allowed to cool over a period of 19 minutes to a temperature of 94° C. Thereafter, the reaction mixture is maintained at a temperature of 94° C. for an additional 107 minutes. The resulting product is a polyisocyanate prepolymer having an isocyanate equivalent weight of 579 and an acid value of 14.6.

[1]PCP-0200 is a copolymer of diethylene glycol and epsilon-caprolactone having an average molecular weight of 530 and a hydroxyl value of 212 available from Union Carbide Corp. [2]DESMODUR-W is dicyclohexylmethane-4,4'-diisocyanate available from MOBAY Chemical Corp.

(c) The aminoalkyloxy silane of part (a) immediately above in an amount of 520.6 grams is mixed at room temperature with 740 grams of anhydrous ethanol. To the resultant mixture is slowly added 1200 grams of the polyisocyanate prepolymer of part (b) immediately above while the temperature is maintained at less than 55° C. The resulting resin composition has an acid value of 7.8, contains 0.01 milliequivalents of amine per gram, has a Gardner-Holdt bubble tube viscosity of 10.2 seconds, a solids content of 105° C. of 60.0 percent by weight, and a solids content at 150° C. of 54.7 percent by weight.

The following EXAMPLE 2 describes a coating composition prepared from the polyisocyanate prepolymer of EXAMPLE 1.

EXAMPLE 2

(a) A vehicle is prepared containing 89.6% by weight of the resin composition of EXAMPLE 1(c) immediately above, 10.0% by weight of an aliphatic diepoxide[1] and 0.4% by weight of diethylammonium triflate.

[1] A diglycidylether of hydrogenated bisphenol-A (DRH 151.1 from Shell Chemical Company.)

A coating composition is prepared by sand milling carbon black, red iron oxide, yellow iron oxide and titanium dioxide with a portion of the vehicle to prepare a pigment paste. The pigment paste is let down with an additional portion of the vehicle to provide a coating composition containing 1.76 g carbon black, 4.55 g yellow iron oxide, 2.35 g red iron oxide and 4.55 g titanium dioxide for each 100 g of vehicle solids.

(b) Aluminum panels (24 gauge; ALODINE 407-47 pretreatment) are coated with the coating composition of part (a) immediately above. The coatings on the panels are cured to a dry film thickness of about 1 mil at the temperatures and for the lengths of time set forth in the following TABLE 2. Tests (1) through (9) as described infra are performed on the cured panels. The results of these tests are summarized in TABLE 2.

TABLE 2

| Curing Time (min)/ Temperature | 10'/325° F., 163° C. | 15'/325° F., 163° C. | 10'/350° F., 177° C. |
|---|---|---|---|
| Gloss 60° | 95 | 96 | 95 |
| Hardness | H | 3H | 3H |
| Solvent Rubs (Methylethyl ketone) | Marginal | Pass | Pass |
| Acid Resistance | Pass | Pass | Pass |
| Watersoak | Fail | Pass | Pass |
| Detergent Resistance | Fail | Pass | Pass |
| Direct Impact | 40/<20 | >60/>60 | >60/>60 |
| Stripper Resistance | Fail | Pass | Pass |
| Mortar Resistance | Fail | Pass | Pass |

[1] A diglycidylether of hydrogenated bisphenol-A (DRH 151.1 from Shell Chemical Company.)

Additionally, cured panels prepared as described immediately above, after outdoor exposure in Florida, U.S.A. for at least 14 months show very good durability.

EXAMPLE 3

(a) An aminoalkyloxy silane is prepared as follows. A reaction vessel equipped with heating mantle, thermometer, stirrer and distillation column is charged at room temperature with a reaction mixture of 1000 grams of 2-amino-2-methylpropanol and 2337 grams of tetraethylorthosilicate. The reaction mixture is heated and distillate is collected according to the schedule set forth in the following TABLE 3. The temperature of the reaction vessel and the head temperature of the distillation column are given for the end of each corresponding time period. The amount of distillate as represented in each horizontal row represents the total distillate collected up to the end of the corresponding time period (i.e., including that collected during the preceding time period). The resulting product is an aminoalkyloxy silane and has a theoretical amine equivalent weight of 251.

TABLE 3

| Time (min) | Temperature of Reaction Vessel (°C.) | Head Temperature (°C.) | Total Distillate Collected (ml) |
|---|---|---|---|
| 0-70 | 112 | 79 | 100 |
| 70-170 | 120 | 78 | 325 |
| 170-270 | 120 | 78 | 435 |
| * | | | |
| 0-95 | 142 | 78 | 490 |
| 95-140 | 159 | 75 | 560 |
| 140-220 | 175 | 74 | 650 |
| 220-260 | 185 | 73 | 675 |
| 260-290 | 190 | 69 | 680 |
| 290-315 | 192 | 65 | 680 |
| 315-330 | 190 | 61 | 680 |

*Heating is discontinued and the reaction mixture allowed to cool.

(b) A polyisocyanate prepolymer is prepared as follows. A reaction vessel equipped with heating mantle, thermometer, stirrer, reflux condenser, and source of nitrogen is charged to room temperature under a blanket of nitrogen with 139.3 g of dimethylol propionic acid, 1468.4 g of PCP-0200[1], 1996.1 g of DESMODUR-W[2], and 396.3 g of methylisobutyl ketone. The reaction mixture is heated over a period of 185 minutes to a temperature of 103° C. after which the reaction mixture is allowed to cool to room temperature. The resulting product is a polyisocyanate prepolymer having an isocyanate equivalent weight of 588 and an acid value of abut 14.8.

[1] As described in footnote 1 of Example 1.
[2] As described in footnote 2 of Example 1.

(c) The polyisocyanate prepolymer product of part (b) immediately above is modified with trimethylolpropane as follows. A reaction vessel equipped as described in part (b) immediately above is charged at room temperature under a blanket of nitrogen with 2102 g of the polyisocyanate prepolymer product of part (b) and the contents of the vessel are heated over a period of 30 minutes to a temperature of 65° C. at which point 130 g of methylisobutyl ketone is added to the vessel. Heating is continued at 65° C. for 4 minutes after which 32.5 g of trimethylolpropane is added to the contents of the vessel. Thereafter the contents of the vessel are heated over a period of 32 minutes to a temperature of 89° C. and thereafter held for 3 hours and 58 minutes at a temperature ranging from 89° C. to 93° C. after which heating is discontinued and the contents of the vessel allowed to cool to room temperature. The resulting product is a polyisocyanate prepolymer having an isocyanate equivalent weight of 801.

(d) The aminoalkyloxy silane of part (a) immediately above in an amount of 439 g is mixed at room temperature with 667.2 g of anhydrous ethanol. To the resultant mixture is slowly added over a period of 15 minutes 1400 g of the polyisocyanate prepolymer product of part (c) immediately above while the temperature is maintained at less than 55° C. The resulting resin composition has an acid value of 7.2, contains 0.04 milliequivalents of amine per gram, has a Gardner-Holdt bubble tube viscosity of 31.5 seconds, a solids content at 105° C. of 58.8 percent by weight, and a solids content at 150° C. of 54.7 percent by weight.

EXAMPLE 4

(a) A polyisocyanate prepolymer is prepared as follows. A reaction vessel equipped with heating mantle, thermometer, stirrer, reflux condenser, and source of nitrogen is charged at room temperature under a blanket of nitrogen with 75 g of dimethylolpropionic acid, 616 g of PCP-0300[1], 1184 g of dicyclohexylmethane-4,4'-diisocyanate, and 330 g of methylisobutyl ketone. The reaction mixture is heated over a period of 30 minutes to a temperature of 65° C. at which point heating is discontinued. Thereafter the reaction mixture exotherms over a period of 30 minutes to a temperature of 103° C. after which the mixture is cooled over a period of 15 minutes to a temperature of 97° C. Thereafter, the reaction mixture is held for 15 minutes in a temperature range of 97° C. to 93° C. after which an additional 130 g of methylisobutyl ketone is added to the mixture. Thereafter, the mixture is maintained in a temperature range of 93° C. to 95° C. over a period of 2 hours and 30 minutes. The resulting product is a polyisocyanate prepolymer having an isocyanate equivalent weight of 532 and an acid value of 14.6.

[1]PCP-0300 is a copolymer of a triol initiator and epsiloncaprolactone having an average molecular weight of 540 and a hydroxyl value of 310 available from Union Carbide Corp.

(b) A reaction vessel equipped with a thermometer, stirrer, reflux condenser, and source of nitrogen is charged at room temperature under a blanket of nitrogen with 646.4 g of the aminoalkyloxy silane product of Example 3(a) and 678 g of anhydrous ethanol. Thereafter, 1370 g of the polyisocyanate prepolymer product of part (a) immediately above is slowly added to the contents of the vessel over a period of 25 minutes while the temperature is maintained at less than 55° C. Thereafter, the contents of the vessel are allowed to cool with stirring over a period of 8 minutes to a temperature of 42° C. Thereafter, a total of 160 g of anhydrous ethanol is added to the contents of the vessel. The resulting resin composition has an acid value of 6.9, contains 0.046 milliequivalents of amine per gram, has a Gardner-Holdt bubble tube viscosity of 42 seconds, a solids content at 105° C. of 55.7 percent by weight, and a solids content at 150° C. of 49.5 percent by weight.

EXAMPLE 5

(a) An aminoalkyloxy silane is prepared from a 1 to 1 mole ratio of 2-amino-2-methylpropanol and tetraethylorthosilicate according to a procedure similar to the procedure for preparation of the aminoalkyloxy silane of Example 3(a). The resulting aminoalkyloxy silane has a theoretical amine equivalent weight of 251.

(b) A polyisocyanate prepolymer is prepared by reacting 139.3 g of dimethylolpropionic acid, 1468.3 g of PCP-0200[1], and 1996.1 g of dicyclohexylmethane-4,4'-diisocyanate (DESMODUR-W[2]), in 396.3 g of methylisobutyl ketone employing a procedure similar to those described for the preparation of polyisocyanate prepolymers in the previous examples. The resulting polyisocyanate prepolymer product has an isocyanate equivalent weight of 593.6 and an acid value of about 14.8.

[1]As described in footnote 1 of Example 1.
[2]As described in footnote 2 of Example 2.

(c) The aminoalkyloxy silane of part (a) immediately above in an amount of 60.6 g is premixed with 8.8 g of isophorone diamine and 113 g of anhydrous ethanol at room temperature. To the resulting composition is slowly added 200 g of the polyisocyanate prepolymer product of part (b) immediately above while maintaining the temperature of the composition below 55° C. The resulting resin composition has an acid value of 8.0, contains 0.045 milliequivalents of amine per gram, has a Gardner-Holdt bubble tube viscosity of 100.8 seconds (Z-4+), a solids content at 105° C. of 62.3 percent by weight and a solids content at 150° C. of 57.6 percent by weight.

(d) The aminoalkyloxy silane of part (a) immediately above in an amount of 43.3 g is premixed with 14.7 g of isophorone diamine and 107 g of anhydrous ethanol at room temperature. To the resulting composition is slowly added 200 g of the polyisocyanate prepolymer product of part (b) immediately above while maintaining the temperature of the composition below 55° C. Thereafter, an additional 50 g of anhydrous ethanol is added to the composition. The resulting resin composition of the invention has an acid value of 7.1, contains 0.053 milliequivalents of amine per gram, has a Gardner-Holdt viscosity of Z-4, a solids content at 105° C. of 56.1 percent by weight, and a solids content at 150° C. of 52.4 percent by weight.

(e) The aminoalkyloxy silane of part (a) immediately above in an amount of 26.0 g is premixed with 20.5 g of isophorone diamine and 100 g of anhydrous ethanol at room temperature. To the resulting composition is slowly added 200 g of the polyisocyanate prepolymer product of part (b) immediately above while maintaining the temperature of the composition below 55° C. Thereafter, an additional 125 g of anhydrous ethanol is added to the composition. The resulting resin composition of the invention has an acid value of 6.2, contains 0.035 milliequivalents of amine per gram, has a Gardner-Holdt bubble tube viscosity of 114 (Z-4+), a solids content at 105° C. of 47.8 percent by weight, and a solids content at 150° C. of 46.3 percent by weight.

EXAMPLE 6

(a) An aminoalkyloxy silane is prepared from a 1 to 1 mole ratio of 2-amino-2-methylpropanol and tetraethylorthosilicate according to a procedure similar to the procedure for preparation of the aminoalkyloxy silane of Example 3(a). The resulting aminoalkyloxy silane has a theoretical amine equivalent weight of 251.

(b) A polyisocyanate prepolymer is prepared as follows. A reaction vessel equipped with heating mantle, thermometer, stirrer, reflux condenser, and source of nitrogen is charged at room temperature under a blanket of nitrogen with 667 g of PCP-0200[1], 46.4 g of N-methyl diethanol amine, 647.7 g of dicyclohexylmethane-4,4'-diisocyanate, and 151 g of 2-ethoxyethylacetate (Cellosolve acetate). The reaction mixture is heated to a temperature of 98° C. and thereafter held at a temperature of about 100° C. for 3 hours and 55 minutes. The resulting product is a polyisocyanate prepolymer having an isocyanate equivalent weight of 970.

[1]As described in footnote 1 of Example 1.

(c) The aminoalkyloxy silane of part (a) immediately above in an amount of 155.3 g is mixed with 238 g of anhydrous ethanol. To the resultant mixture is slowly added with stirring 600 g of the polyisocyanate prepolymer product of part (b) immediately above over a period of about 6 minutes while the temperature is maintained below 55° C. Thereafter, stirring is continued for approximately an additional 10 minutes. The resulting product represents an ungelled resin suitable for a composition of the invention.

EXAMPLE 7

(a) An aminoalkyloxy silane is prepared from a 1 to 1 mole ratio of 2-amino-2-methylpropanol and tetraethylorthosilicate according to a procedure similar to the procedure for preparation of the aminoalkyloxy silane of Example 3(a). The resulting aminoalkyloxy silane has a theoretical amine equivalent weight of 251.

(b) A polyisocyanate prepolymer is prepared by reacting 667 g of PCP-0200[1], 40.6 of neopentyl glycol, 647.7 g of dicyclohexylmethane-4,4'-diisocyanate, in 150 g of 2-ethoxyethylacetate (Cellosolve acetate) employing a procedure similar to that described for the preparation of the polyisocyanate prepolymer of Example 6(b). The resulting polyisocyanate prepolymer product has an isocyanate equivalent weight of 980.2.

[1]As described in footnote 1 of Example 1.

(c) The aminoalkyloxy silane of part (a) immediately above in an amount of 153.7 g is mixed at room temperature with 693.7 g of anhydrous ethanol. To the resultant mixture is added with stirring over a period of about 4 minutes 600 g of the polyisocyanate prepolymer product of part (b) immediately above while the temperature is maintained below 55° C. Thereafter, stirring is continued for about an additional 10 minutes. The resulting product represents an ungelled resin suitable for a composition of the invention. The product contains 0.01 equivalents of amine per gram, has a solids content at 105° C. of 46.6 percent by weight, and has a solids content at 150° C. of 44.1 percent by weight.

EXAMPLE 8

(a) An aminoalkyloxy silane is prepared from a 1 to 1 mole ratio of 2-amino-2-methylpropanol and tetraethylorthosilicate according to a procedure similar to the procedure for preparation of the aminoalkyloxy silane of Example 3(a). The resulting aminoalkyloxy silane has a theoretical amine equivalent weight of 251.

(b) A polyisocyanate prepolymer is prepared by reacting 667 g of PCP-0200[1], 52.3 g of dimethylolpropionic acid, 647.7 g of dicyclohexylmethane-4,4'-diisocyanate, in 152 g of 2-ethoxyethylacetate (Cellosolve acetate) employing a procedure similar to that described for the preparation of the polyisocyanate prepolymer of Example 6(b). The resulting polyisocyanate prepolymer product has an isocyanate equivalent weight of 1023.5.

[1]As described in footnote 1 of Example 1.

(c) The aminoalkyloxy silane of part (a) immediately above in an amount of 147.1 g is mixed at room temperature with 234.5 g of anhydrous ethanol. To the resultant mixture is added with stirring over a period of about 4 minutes 600 g of the polyisocyanate prepolymer product of part (b) immediately above while the temperature is maintained below 55° C. Thereafter, stirring is continued for about an additional 10 minutes. The resulting product represents an ungelled resin suitable for a composition of the invention. The product contains 0.03 milliequivalents of amine per gram, has an acid value of 8.6, has a solids content at 105° C. of 65.0 percent by weight and a solids content at 150° C. of 60.5 percent by weight.

EXAMPLE 9

(a) An aminoalkyloxy silane is prepared as follows. A reaction vessel equipped with heating mantle, thermometer, stirrer and distillation column is charged at room temperature with a reaction mixture of 498.7 g of 2-aminoethanol and 1701 g of tetraethylorthosilicate. The reaction mixture is heated and distillate is collected according to the schedule set forth in the following TABLE 4. The temperature of the reaction vessel and the head temperature of the distillation column are given for the end of each corresponding time period. The amount of distillate as represented in each horizontal row represents the total distillate collected up to the end of the corresponding time period (i.e., including that collected during the preceding time period). The resulting product is an aminoalkyloxy silane and has a theoretical amine equivalent weight of 223.

TABLE 4

| Time (min) | Temperature of Reaction Vessel (°C.) | Head Temperature (°C.) | Total Distillate Collected (ml) |
|---|---|---|---|
| 0–225 | 113 | 79 | 140 |
| 255–277 | 112 | 79 | 205 |
| 277–308 | 126 | 72 | 305 |
| 308–336 | 131 | 77 | 345 |
| * | | | |
| 0–140 | 148 | 76 | 425 |
| 140–200 | 158 | 71 | 465 |

*Heating is discontinued and the reaction mixture allowed to cool.

(b) A polyisocyanate prepolymer is prepared from the same ingredients, in the same amounts, and according to a similar procedure as for preparation of the polyisocyanate prepolymer of Example 5(b) and is mixed with an amount of the polyisocyanate prepolymer of Example 5(b). The resulting polyisocyanate prepolymer product has an isocyanate equivalent weight of 554.3.

(c) The aminoalkyloxy silane of part (a) immediately above in an amount of 80.5 g is mixed at room temperature with 115 g of anhydrous ethanol. To the resultant mixture is added slowly with stirring 200 g of the polyisocyanate prepolymer product of part (b) immediately above while the temperature is maintained below 55° C. The resulting product represents an ungelled resin suitable for a composition of the invention. The product contains 0.036 milliequivalents of amine per gram, has an acid value of 7.4, has a Gardner-Holdt bubble tube viscosity of 6.0 seconds, has a solids content at 105° C. of 56.9 percent by weight and a solids content at 150° C. of 53.7 percent by weight.

EXAMPLE 10

(a) An aminoalkyloxy silane is prepared by reacting 344.5 g of monoisopropanol amine and 955.5 g of tetraethylorthosilicate according to a procedure similar to the procedure for preparation of the aminoalkyloxy silane of Example 3(a). A total of 265 ml of distillate is collected. The resulting product is an aminoalkyloxy silane and has a theoretical amine equivalent weight of 237.

(b) The aminoalkyloxy silane of part (a) immediately above in an amount of 85.5 g is mixed at room temperature with 120 g of anhydrous ethanol. To the resultant mixture is added slowly with stirring 200 g of the polyisocyanate prepolymer product of Example 9(b) while the temperature is maintained below 55° C. The resulting product represents an ungelled resin suitable for a composition of the invention. The product contains 0.052 milliequivalents of amine per gram, has an acid value of 7.1, has a Gardner-Holdt bubble tube viscosity of 12.7 seconds, has a solids content at 105° C. of 57.4 percent by weight and a solids content at 150° C. of 54.6 percent by weight.

EXAMPLE 11

This example illustrates the preparation of a resin corresponding to formula (I) in which $R^1$ represents the radical

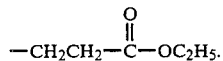

(a) A reaction vessel equipped with stirrer and means for cooling the contents of the vessel is charged at room temperature with 223 g of the aminoalkyloxy silane prepared in Example 9(a). Thereafter, 100 g of ethyl acrylate is added dropwise with stirring over a period of 35 minutes to the contents of the vessel while the temperature is maintained in the range of from 20° C. to 35° C. Thereafter, the contents of the vessel are stirred for 1 hour. The resulting product has a theoretical amine equivalent weight of 323.

(b) The reaction product of part (a) immediately above in an amount of 116.5 g is mixed at room temperature with 135 g of anhydrous ethanol. To the resultant mixture is added slowly with stirring 200 g of the polyisocyanate prepolymer product of Example 9(b) while the temperature is maintained below 55° C. The resulting product represents a resin of the invention. The product contains 0.082 milliequivalents of amine per gram, has a Gardner-Holdt bubble tube viscosity of 5.0 seconds, has an acid value of 6.3, has a solids content at 105° C. of 58.5 percent by weight and a solids content at 150° C. of 53.4 percent by weight.

EXAMPLE 12

(a) An aminoalkyloxy silane is prepared from 359.6 g of 2-amino-2-methylpropanol and 840.4 g of tetraethylorthosilicate according to a procedure similar to the procedure for preparation of the aminoalkyloxy silane of Example 3(a). A total of 233 ml of distillate is collected. The resulting aminoalkyloxy silane has a theoretical amine equivalent weight of 251.

(b) A polyisocyanate prepolymer is prepared as follows. A reaction vessel equipped with heating mantle, thermometer, stirrer, and reflux condenser is charged at room temperature with 77.3 g of dimethylolpropionic acid, 815 g of PCP-0200[1], and 1108 g of dicyclohexylmethane-4,4'-diisocyanate (DESMODUR-W). The reaction mixture is heated over a period of 90 minutes to a temperature of 78° C. after which heating is discontinued. The temperature continues to rise over the next 10 minutes to 140° C. after which the reaction mixture is cooled over the next 14 minutes to 90° C. Thereafter, the temperature of the reaction mixture rises and is maintained at about 98° C. over a period of 261 minutes. The resulting product is a polyisocyanate prepolymer having an isocyanate equivalent weight of 536.9.

[1]As described in footnote 1 of Example 1.

(c) Three ungelled resins herein designated 12A, 12B and 12C respectively are prepared as follows. Three reaction vessels are charged with the ingredients set forth in TABLE 5 under "Charge 1". Thereafter, to each of the reaction vessels is slowly added with stirring the polyisocyanate prepolymer product of part (b) immediately above in the amounts set forth in TABLE 5 under "Charge 2" while the temperature of the contents of the vessels is maintained at about 80° C. to about 90° C. The milliequivalents (meq) of amine per gram, Gardner-Holdt bubble tube viscosity, and solids contents at 105° C. and 150° C. of each of the resulting resin products A, B and C are as set forth in TABLE 5.

TABLE 5

| | Weight (g) | | |
|---|---|---|---|
| | A | B | C |
| Charge 1 | | | |
| Anhydrous ethanol | 150 | 150 | 150 |
| Gamma-aminopropyltrimethoxysilane | 53.5 | 28.8 | 0 |
| Aminoalkyloxy silane[2] | 32.7 | 60.8 | 93.5 |
| Charge 2 | | | |
| Polyisocyanate prepolymer[3] | 200 | 200 | 200 |
| Meq amine/gram | 0.016 | 0.062 | 0.020 |

TABLE 5-continued

| | Weight (g) | | |
|---|---|---|---|
| | A | B | C |
| Gardner-Holdt viscosity (seconds) | 18.1 | 28.5 | 50.7 |
| Solids Content (2 hours/105° C.) | 62.5 | 63.3 | 67.3 |
| Solids Content (2 hours/150° C.) | 59.4 | 60.2 | 60.1 |

[2]The aminoalkyloxy silane of Example 12 (a).
[3]The polyisocyanate prepolymer product of Example 12(b).

EXAMPLE 13

(a) A composition containing perethyldisilicate is prepared as follows. A reaction flask equipped with thermometer, stirrer, condenser, and source of nitrogen is charged under a blanket of nitrogen with 14,400 g of tetraethylorthosilicate, 2,880 g of ethyl alcohol, and 0.864 g of a 37 percent by weight solution of hydrochloric acid. Thereafter, 482.4 g of deionized water is slowly added with stirring to the contents of the reaction flask over a period of 82 minutes after which stirring is continued for an additional 48 minutes. The resulting composition contains perethyl disilicate, has a residual water content of 0.07 percent by weight, and has a solids content at 105° C. of 7.3 percent by weight.

(b) An aminoalkyloxy silane is prepared as follows. A reaction vessel equipped with heating mantle, thermometer, stirrer, and distillation column is charged at room temperature with 190.6 g of 2-amino-2-methylpropanol and 1109.8 g of the composition containing perethyldisilicate of part (a) immediately above. The reaction mixture is heated and distillate is collected according to the schedule set forth in the following TABLE 6. The temperature of the reaction vessel and the head temperature of the distillation column are given for the end of each corresponding time period. The amount of distillate in each horizontal row represents the total distillate collected up to the end of the corresponding time period (i.e., including that collected during the preceding time period). The resulting product is an aminoalkyloxy silane and has a theoretical amine equivalent weight of 385.

TABLE 6

| Time (min) | Temperature of Reaction Vessel (°C.) | Head Temperature (°C.) | Total Distillate Collected (ml) |
|---|---|---|---|
| 0–80 | 89 | 77 | 85 |
| 80–135 | 90 | 76 | 305 |
| * | | | |
| 0–60 | 135 | 79 | 505 |
| 60–107 | 147 | 76 | 600 |

*Heating is discontinued and the reaction mixture allowed to cool.

(c) A polyisocyanate prepolymer is prepared by reacting 77.3 g of dimethylolpropionic acid, 815 g of PCP-0200[1], and 1108 g of dicyclohexylmethane-4,4'-diisocyanate (DESMODUR-W) in 220 g of methylisobutyl ketone according to a procedure similar to the procedure for preparation of the polyisocyanate prepolymer of Example 1(b). The resulting polyisocyanate prepolymer product has an isocyanate equivalent weight of 578.6 and an acid value of 14.6.

[1]As described in footnote 1 of Example 1.

(d) The aminoalkyloxy silane of part (b) immediately above in an amount of 99.6 g is mixed at room temperature with 110 g of anhydrous ethanol. To the resultant mixture is added slowly with stirring 150 g of the polyisocyanate prepolymer product of part (c) immediately above while the temperature is maintained below 55° C.

The resulting product represents an ungelled resin suitable for a composition of the invention. The product contains 0.748 milliequivalents of amine per gram, has a Gardner-Holdt bubble tube viscosity of 14.2 seconds, has an acid value of 5.9, has a solids content at 105° C. of 58.1 percent by weight and a solids content at 150° C. of 51.5 percent by weight.

EXAMPLE 14

(a) An aminoalkyloxy silane is prepared as follows. A reaction vessel equipped with heating mantle, thermometer, stirrer, and distillation column is charged at room temperature with a reaction mixture of 133 g of diisopropanol amine and 416 g of tetraethylorthosilicate. The reaction mixture is heated and distillate is collected according to the schedule set forth in the following TABLE 7. The temperature of the reaction vessel and the head temperature of the distillation column are given for the end of each corresponding time period. The amount of distillate in each horizontal row represents the total distillate collected up to the end of the corresponding time period (i.e., including that collected during the preceding time period). The resultant product is an aminoalkyloxy silane and has a theoretical amine equivalent weight of 457.

TABLE 7

| Time (min) | Temperature of Reaction Vessel (°C.) | Head Temperature (°C.) | Total Distillate Collected (ml) |
|---|---|---|---|
| 0–180 | 116 | 72 | 40 |
| 180–195 | 116 | 72 | 50 |
| * | | | |
| 0–60 | 121 | 72 | 60 |
| 60–90 | 150 | 74 | 84 |
| 90–130 | 172 | 74 | 95 |
| 130–167 | 187 | 50 | 115 |

*Heating is discontinued and the reaction mixture allowed to cool.

(b) The aminoalkyloxy silane of part (a) immediately above in an amount of 118.2 g is mixed at room temperature with 120 g of anhydrous ethanol. To the resultant mixture is added slowly with stirring 150 g of the polyisocyanate prepolymer product of Example 13(c) while the temperature is maintained below 55° C. The resulting product represents an ungelled resin suitable for a composition of the invention. The product contains 0.536 milliequivalents of amine per gram, has a Gardner-Holdt bubble tube viscosity of 22.5 seconds, has an acid value of 6.1, has a solids content at 105° C. of 55.5 percent by weight and a solids content at 150° C. of 50.1 percent by weight.

What is claimed is:

1. A composition comprising:
(A) an ungelled resin containing a compound corresponding to the formula,

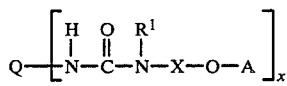

wherein
Q represents the residue of an organic isocyanate having an average isocyanate functionality of at least 1,
$R^1$ independently represents H, a $C_1$ to $C_{10}$ alkyl radical, a $C_1$–$C_{10}$ hydroxyalkyl radical or a radical corresponding to the formula

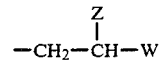

wherein Z represents H or $C_1$ to $C_4$ alkyl, and W represents

in which $R^8$ represents $C_1$ to $C_8$ alkyl,
X represents a divalent radical containing at least 2 carbon atoms,
A represents a monovalent silicon-containing group corresponding to the formula

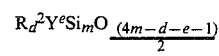

wherein
$R^2$ independently represents hydrogen, a $C_1$ to $C_{10}$ alkyl group, a $C_4$ to $C_{10}$ cycloalkyl group, a $C_6$ to $C_{10}$ aryl group, or a monovalent aminoalkyl group, that is attached directly to Si,
Y represents a hydrolyzable group that is attached directly to Si
m is an integer ranging from 1 to 5,
e is a positive integer wherein $1 \leq e \leq 11$, d is zero or a positive integer wherein $0 \leq d \leq 10$, and $3 \leq d + e \leq 11$, and
wherein x is a positive number which is equal to or less than the average isocyanate functionality of said organic isocyanate; and
(B) an effective amount of a cure-accelerating catalyst selected from the group consisting of trifluoromethane sulfonic acid, a neutralization product of trifluoromethane sulfonic acid with ammonia, a neutralization product of trifluoromethane sulfonic acid with an amine, a tetraalkyl ammonium salt of trifluoromethane sulfonic acid, and a mixture thereof.

2. The composition of claim 1 wherein said hydrolyzable group Y is selected from the group consisting of

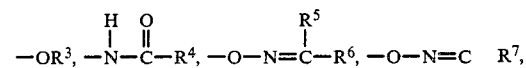

and the $C_2$ to $C_3$ residue of a 1,2- or 1,3-glycol, wherein
$R^3$ represents $C_1$–$C_7$ alkyl, $C_6$–$C_8$ cycloalkyl, $C_6$–$C_8$ aryl, or $C_3$–$C_8$ alkoxyalkyl,
$R^4$ represents H or $C_1$–$C_4$ alkyl,
$R^5$ and $R^6$ independently represent $C_1$–$C_4$ alkyl, $C_6$–$C_8$ cycloalkyl, or $C_6$–$C_8$ aryl, and
$R^7$ represents $C_4$–$C_7$ alkylene.

3. The composition of claim 2 wherein Q represents the residue from an isocyanate-functional polyisocyanate which is a reaction product of an organic polyisocyanate and a polyol having an average molecular weight ranging from 62 to about 3,000.

4. The composition of claim 3 wherein said polyol comprises a polyester polyol having an average molecular weight ranging from about 170 to about 2,000.

5. The composition of claim 1 additionally comprising an epoxy resin.

6. The composition of claim 5 wherein said epoxy resin contains an aliphatic diepoxide.

7. The composition of claim 3 wherein said polyol comprises a polyol containing at least one carboxylic acid group.

8. The composition of claim 5 wherein said cure-accelerating catalyst is a neutralization product of triflic acid with an amine.

9. The composition of claim 5 wherein said cure-accelerating catalyst is a tetraalkyl ammonium salt of triflic acid.

10. The composition of claim 5 wherein Q represents the residue from an isocyanate-functional polyisocyanate prepolymer which is a reaction product of an organic polyisocyanate and a polyol, which polyol has an average molecular weight ranging from 62 to about 3,000; $R^1$ represents hydrogen; A represents a monovalent silicon-containing group from an organosilicate and d equals zero.

11. The composition of claim 10 wherein said polyol comprises a polyol containing at least one carboxylic acid group.

12. A two-pack composition, a first pack comprising an ungelled resin containing a compound according to the formula, $$Q\left[\begin{array}{ccc} H & O & R^1 \\ | & \| & | \\ N-C-N-X-O-A \end{array}\right]_x$$

wherein

Q represents the residue of an organic isocyanate having an average isocyanate functionality of at least 1, $R^1$ independently represents H or a $C_1$ to $C_{10}$ alkyl radical, a $C_1$-$C_{10}$ hydroxyalkyl radical or a radical corresponding to the formula $$-CH_2-\overset{Z}{\underset{|}{CH}}-W$$

wherein Z represents H or $C_1$ to $C_4$ alkyl, and W represents $$-\overset{O}{\underset{\|}{C}}-OR^8, \quad -C\equiv N, \quad \text{or} \quad -\overset{O}{\underset{\|}{C}}-R^8$$

in which $R^8$ represents $C_1$ to $C_8$ alkyl,

X represents a divalent radical containing at least 2 carbon atoms,

A represents a monovalent silicon-containing group corresponding to the formula $$R_d^2 Y_e SiO_{\frac{4m-d-e-1}{2}}$$

wherein $R^2$ independently represents hydrogen, a $C_1$ to $C_{10}$ alkyl group, a $C_4$ to $C_{10}$ cycloalkyl group, a $C_6$ to $C_{10}$ aryl group, or a monovalent aminoalkyl group, that is attached directly to Si, Y represents a hydrolyzable group that is attached directly to Si m is an integer ranging from 1 to 5, e is a positive integer wherein $1 \leq e \leq 11$, d is zero or a positive integer wherein $0 \leq d \leq 10$, and $3 \leq d+e \leq 11$, and wherein x is a positive number which is equal to or less than the average isocyanate functionality of said organic isocyanate; and a second pack comprising an effective amount of a cure-accelerating catalyst selected from the group consisting of trifluoromethane sulfonic acid, a neutralization product of trifluoromethane sulfonic acid with ammonia, a neutralization product of trifluoromethane sulfonic acid with an amine, a tetraalkyl ammonium salt of trifluoromethane sulfonic acid, and a mixture thereof.

13. The two pack composition of claim 12 additionally comprising an epoxy resin in said first pack.

14. The two pack composition of claim 13 wherein said epoxy resin contains an aliphatic diepoxide.

15. The two pack composition of claim 12 wherein said cure-accelerating catalyst is a neutralization product of triflic acid with an amine.

16. The two pack composition of claim 12 wherein said cure-accelerating catalyst is a tetraalkyl ammonium salt of triflic acid.

17. The two pack composition of claim 13 where for said resin, Q represents the residue from an isocyanate-functional polyisocyanate which is a reaction product of an organic polyisocyanate and a polyol, which polyol has an average molecular weight ranging from 62 to about 3,000; $R^1$ represents hydrogen; and A represents a monovalent silicon-containing group from an organosilicate and d equals zero.

18. The two pack composition of claim 17 wherein said polyol comprises a polyol containing at least one carboxylic acid group.

19. The composition of claim 1 wherein X represents a divalent radical containing at least 2 carbon atoms containing one or more groups selected from ether, amino, amido, carbamate, urea, and thio.

20. The two-pack composition of claim 12 wherein X represents a divalent radical containing at least 2 carbon atoms containing one or more groups selected from ether, amino, amido, carbamate, urea, and thio.

* * * * *